United States Patent
Matsuda et al.

(10) Patent No.: US 7,467,588 B2
(45) Date of Patent: Dec. 23, 2008

(54) GAS GENERATOR FOR AIR BAG

(75) Inventors: Naoki Matsuda, Himeji (JP); Masato Hirooka, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 492 days.

(21) Appl. No.: 10/729,009

(22) Filed: Dec. 8, 2003

(65) Prior Publication Data
US 2004/0144281 A1 Jul. 29, 2004

Related U.S. Application Data

(60) Provisional application No. 60/432,659, filed on Dec. 12, 2002.

(30) Foreign Application Priority Data
Dec. 9, 2002 (JP) .............................. 2002-356701

(51) Int. Cl.
*B60R 21/16* (2006.01)
(52) U.S. Cl. .................... 102/530; 102/531; 280/741
(58) Field of Classification Search ................... 149/22, 149/36, 45, 61, 62; 280/741, 736, 740, 742; 264/3.1; 102/530–531
See application file for complete search history.

(56) References Cited

U.S. PATENT DOCUMENTS

| | | | | |
|---|---|---|---|---|
| 5,780,767 A | * | 7/1998 | Matsuda et al. | 149/2 |
| 6,139,055 A | * | 10/2000 | Dahl et al. | 280/741 |
| 6,143,102 A | * | 11/2000 | Mendenhall et al. | 149/45 |
| 6,196,581 B1 | | 3/2001 | Katsuda et al. | |
| 6,224,099 B1 | * | 5/2001 | Nielson et al. | 280/741 |
| 6,485,051 B1 | * | 11/2002 | Taguchi et al. | 280/736 |
| 6,517,647 B1 | * | 2/2003 | Yamato | 149/45 |
| 6,540,256 B2 | | 4/2003 | Iwai et al. | |
| 6,860,510 B2 | * | 3/2005 | Ogawa et al. | 280/736 |
| 2003/0145922 A1 | * | 8/2003 | Taylor et al. | 149/22 |
| 2004/0155444 A1 | * | 8/2004 | Matsuda et al. | 280/741 |
| 2004/0207188 A1 | * | 10/2004 | Matsuda et al. | 280/741 |

FOREIGN PATENT DOCUMENTS

| | | |
|---|---|---|
| EP | 0864553 A1 | 9/1998 |
| JP | 9-226506 A | 9/1997 |
| JP | 10-44916 A | 2/1998 |
| JP | 11-334517 A | 12/1999 |

* cited by examiner

*Primary Examiner*—David J Parsley
(74) *Attorney, Agent, or Firm*—Birch, Stewart, Kolasch & Birch, LLP

(57) ABSTRACT

A gas generator for an air bag, includes: a housing having a gas discharging hole; an ignition unit activated upon an impact, the ignition unit including at least one igniter and at least one transfer charge, the transfer charge being a mixture of a transfer charge power and a gas generating agent molded article, and the gas generating agent molded article generates a gas of at least 1.2 moles/100 g; and a combustion chamber accommodating a gas generating agent which is ignited and burnt to generate a combustion gas.

10 Claims, 2 Drawing Sheets

GAS GENERATOR FOR AIR BAG

This Nonprovisional application claims priority under 35 U.S.C. § 119(e) on U.S. Provisional Application No. 60/432,659 filed on Dec. 12, 2002 and under 35 U.S.C. § 119(a) on Patent Application No. 2002-356701 filed in Japan on Dec. 9, 2002, the entire contents of which are hereby incorporated by reference.

BACKGROUND OF THE INVENTION

1. Field of the Invention

The present invention relates to a gas generator for an air bag for protecting a passenger from an impact.

2. Description of the Related Art

A gas generator for an air bag incorporated in an air bag system mounted in an automobile needs to satisfy various requirements in view of protection of a passenger. For example, the gas generator is required to reliably operate for at least ten years which is about the normal service life of a vehicle in which the gas generator is mounted.

In order to reduce the gas generator in size, it is desirable to use a gas generating agent having low combustion temperature so that a coolant/filter may have a coarse structure. On the other hand, in order to secure the operational reliability, it is preferable that ignitability and flammability of the gas generating agent are excellent.

However, the gas generating agent having low combustion temperature generally has poor ignitability. Therefore, to suppress generation of a harmful gas and to improve ignitability and flammability of the gas generating agent in order to secure the operational reliability are contradicting technical objects.

JP-A No. 11-334517 is a prior art related to the present invention.

SUMMARY OF THE INVENTION

The present invention provides a gas generator for an air bag capable of reducing an amount of generated harmful gas such as NOx at the time of activation, capable of improving flammability of a gas generating agent and capable of securing the operational reliability.

To solve the problem, the invention provides a gas generator for an air bag comprising a housing including a gas discharge hole, ignition means activated by an impact, and a combustion chamber accommodating a gas generating agent which is ignited and burnt to generate a combustion gas, wherein the ignition means includes an igniter and a transfer charge, the transfer charge is a mixture of transfer charge powder and gas generating agent molded article, the gas generating agent molded article generates a gas of 1.2 moles/100 g or more.

The gas generator of the present invention may be of a single type having single ignition means or of a dual type having two ignition means.

The gas generator includes an igniter (electrical or mechanical igniter) and a transfer charge as the ignition means for the gas generating agent. The transfer charge is ignited by activation of the igniter, ignition energy in a form of flame or high temperature gas is generated, the gas generating agent is ignited and burnt by the ignition energy, and a gas for inflating the air bag is generated.

During this process, when a gas generating agent having a low combustion temperature is used to reduce an amount of NOx to be generated, the ignitability and flammability are poor, and therefore, it is necessary to generate greater ignition energy.

In order to increase the ignition energy, an amount of transfer charge may simply be increased, but in such a case, it is naturally necessary to increase a volume of a space for accommodating the transfer charge. However, since it is always required to reduce the gas generator in both size and weight, it is difficult to increase the size of the entire gas generator and the transfer charge accommodating space. Conventionally, there is a mixture of boron and potassium nitrate (niter) as an agent used as the transfer charge, but since the igniting time is short and duration time of generated energy is also short, the ignitability of the gas generating agent having the low combustion temperature is insufficient.

Thereupon, by using the mixture of the transfer charge powder and the gas generating agent molded article as the transfer charge, when the volume is the same, as compared with a case in which only the transfer charge is used, it is possible that the energy for igniting the gas generating agent is endured to supply the energy to the gas generating agent, that an internal pressure in the combustion chamber is increased to enhance the ignitability of the gas generating agent, and that the charging mass as the transfer charge is increased. Therefore, it is possible to increase the amount of the ignition energy to be generated and the internal pressure at the time of combustion without increasing the entire gas generator and the size of the transfer charge accommodating space.

It is preferable that a mass ratio between the transfer charge powder and the gas generating agent molded article, i.e., transfer charge power/gas generating agent molded article is 2/8 to 8/2, and more preferably 3/7 to 7/3.

The gas generating agent molded article used as the transfer charge and a shape of the gas generating agent molded article accommodated in the combustion chamber are not especially limited. A disk-like molded article having a through-hole or non-through-hole (recess), or a columnar molded article having a through-hole or non-through-hole (recess) can also be used.

In the gas generator for the air bag according to the present invention, the housing includes two ignition means therein, each of the two ignition means includes an igniter and a transfer charge, and when the two igniters are activated with a time lag, a second transfer charge combined with a second igniter which is activated with a delay may comprise only a gas generating agent molded article.

When the gas generator is of a dual type having two ignition means, the transfer charge (first transfer charge) combined with one of the igniters (first igniter) which is activated first uses the transfer charge and the gas generating agent molded article as described above, but the transfer charge (second transfer charge) combined with the other igniter (second igniter) which is activated with a delay can use only the gas generating agent molded article.

The generally used transfer charge is expensive, and the gas generating agent is less expensive. Thus, it is preferable that only the gas generating agent molded article is used as the second transfer charge to reduce the manufacturing cost. The main purpose for using the transfer charge is to generate the ignition energy, and the transfer charge does not generate enough amount of gas to inflate the air bag. However, if the gas generating agent molded article is used as the second transfer charge, the gas generating agent molded article can be used for igniting the gas generating agent accommodated in the combustion chamber, and combustion gas generated from the second transfer charge itself can also be used for inflating the air bag.

The same gas generating agent accommodated in the combustion chamber can be used as the gas generating agent molded article used as the transfer charge, but it is preferable to use the agent having higher combustion temperature and more excellent ignitability than those of the gas generating agent accommodated in the combustion chamber. The amount of the gas generating agent molded article used as the transfer charge is very small as compared with the amount of the gas generating agent accommodated in the combustion chamber, and therefore, even if the agent having high combustion temperature and excellent ignitability is used, an amount of NOx to be generated is very small.

In this invention, a mixture of boron and niter for general purpose use can be used as the transfer charge.

To reduce an amount of NOx to be generated, it is preferable that the gas generating agent for inflating the air bag accommodated in the combustion chamber has the combustion temperature of 1000 to 1700° C. (including guanidine nitrate and basic copper nitrate), and it is preferable that the gas generating agent used as the transfer charge has the combustion temperature of 1700 to 3000° C.

The gas generating agent having such a low combustion temperature has inferior ignitability, but since sufficient ignition energy amount can be secured in this invention, the gas generating agent having the low combustion temperature has the same ignitability as that having a high combustion temperature.

When the gas generating agent (for inflating the air bag) having the low combustion temperature (1000 to 1700° C.) is used, since the ignitability of the gas generating agent is low, it is necessary to supply sufficient ignition energy. Therefore, if the transfer charge powder and the gas generating agent molded article generating a gas of 1.2 moles/100 g or more are mixed and used, the supply of the ignition energy to the gas generating agent for inflating the air bag can be endured for a certain time, and a pressure in the combustion chamber can be increased by a gas from the gas generating agent molded article. Therefore, the ignitability of the gas generating agent for inflating the air bag is enhanced.

When the transfer charge is a mixture of the transfer charge powder and the gas generating agent molded article, the transfer charge powder generates the ignition energy for burning the gas generating agent accommodated in the combustion chamber, and does not substantially generate a gas inflating the air bag. The gas generating agent molded article (molded article for generating a gas of 1.2 moles/100 g or more) generates the ignition energy and a gas for inflating the air bag.

Further, in the present invention, an agent which generates ammonia by combustion is used as the gas generating agent accommodated in the combustion chamber, and the gas generating agent which generates NOx by combustion is used as the gas generating agent used as the transfer charge. With this, the agent reacts with ammonia and NOx and can converts them into nitrogen gas and as a result, it is possible to reduce an amount of ammonia and NOx to be generated.

According to the gas generator for the air bag, in order to reduce an amount of a harmful gas such as NOx at the time of activation, even if the gas generating agent having a low combustion temperature and inferior ignitability, the same ignitability as that of a case in which a gas generating agent having a high combustion temperature and excellent ignitability is used can be secured. Therefore, it is possible to reduce an amount of NOx generated at the time of activation, to secure the reliability of activation and further to reduce the gas generator in size.

DETAILED DESCRIPTION OF THE INVENTION

Figure 1:
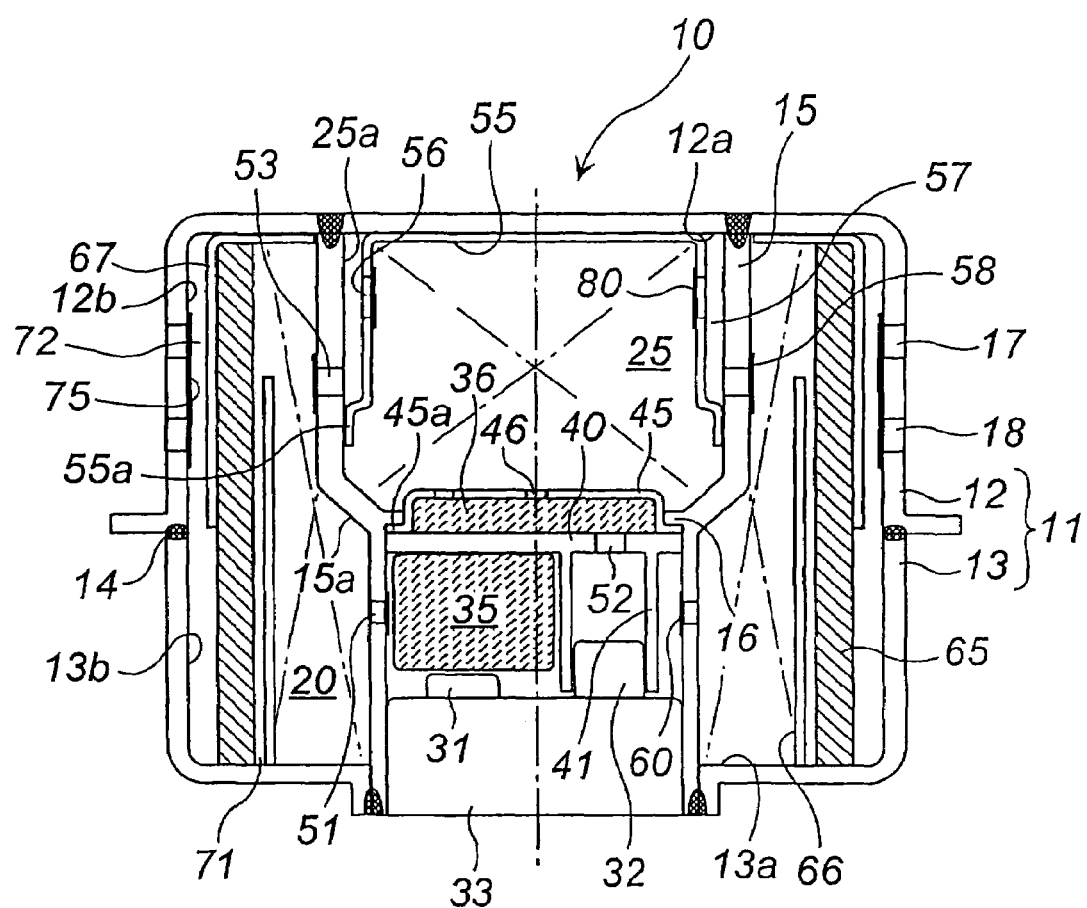
FIG. 1 is an axial sectional view of a gas generator for an air bag.

Embodiments of the present invention will be explained with reference to the drawings. FIG. 1 is an axial sectional view of a gas generator for an air bag of the present invention. In the following description, a vertical relationship such as "upper" or "lower" is indicated with reference to FIG. 1, "the axial direction" means the axial direction of a housing, and "the radial direction" means the radial direction of the housing.

In a gas generator 10, an outer shell container is formed of a housing 11. The housing 11 is formed by bonding a diffuser shell 12 to a closure shell 13. The diffuser shell 12 and the closure shell 13 form an inner accommodating space. The diffuser shell 12 and the closure shell 13 are welded to each other at a welded portion 14. In FIG. 1, other dark shaded portions also indicate welded portions.

The diffuser shell 12 is provided with a necessary number of gas discharging ports 17 and 18. Diameters of the gas discharging ports 17 and 18 may be the same or different.

A substantially cylindrical inner cylinder 15 is disposed in the housing 11. An upper end edge of the inner cylinder 15 is joined to a ceiling surface 12a of the diffuser shell 12, and a lower end edge of the inner cylinder 15 is joined to a bottom surface 13a of the closure shell 13, thereby separating inner and outer spaces from each other.

The inner cylinder 15 has a radially increasing diameter by an inclined wall portion 15a so that an inner diameter of an upper portion of the inner cylinder 15 (in the ceiling surface 12a side) becomes larger than an inner diameter of a lower portion of the inner cylinder 15 (in the bottom surface 13a side). By setting the shape of the inner cylinder 15 as shown in FIG. 1, a volume in the inner space, especially a volume ratio of a first combustion chamber 20 and a second combustion chamber 25 can be adjusted (in the range of 4/6 to 9/1, preferably 1/1 to 8/2 for example), while the height of the gas generator 10 is kept short, which is preferable.

An annular (or cylindrical) first combustion chamber 20 is provided in a space outside the inner cylinder 15, and a first gas generating agent (not shown) is accommodated in the first combustion chamber 20.

A second combustion chamber 25 is provided in an upper space of the inner cylinder 15, and a second gas generating agent (not shown) is accommodated in the second combustion chamber 25. An ignition means chamber in which two ignition means are accommodated is provided in a lower space of the inner cylinder 15.

A first igniter 31 and a first transfer charge 35 are disposed in the first ignition means chamber. A second igniter 32 and a second transfer charge 36 are disposed in the second ignition means chamber. The first igniter 31 and the second igniter 32 are fixed to a single collar 33, and are mounted in parallel to each other in the radial direction. When an air bag module including the gas generator 10 is mounted to a vehicle, the first igniter 31 and the second igniter 32 are connected to a power supply (battery) through a connector and a lead wire.

A vertical space in the inner cylinder 15, i.e., a space between the second combustion chamber 25, and the first igniter 31 and the second igniter 32 is divided by a flat plate-like partition wall 40 having a skirt portion 41 and a second through-hole 52. The flat plate-like partition wall 40 is fitted into a stepped notch 16 of the inner cylinder 15 from the lower side and thus, even when the first igniter 31 is activated, the flat plate-like partition wall 40 is prevented from moving vertically by a pressure caused at the time of activation. An inner diameter of the skirt portion 41 is set substantially the same as a diameter of the igniting portion of the igniter 32, and the skirt portion 41 comes into intimate contact with the igniting portion and surrounds the same. Therefore, flame generated by activation of the second igniter 32 moves straight only toward the second through-hole 52.

By disposing the flat plate-like partition wall 40 having the skirt portion 41, the second combustion chamber 25 and the two igniters are separated, and the first igniter 31 and the second igniter 32 are separated. Therefore, ignition energy (flame, combustion gas or the like) generated by the operation of the first igniter 31 is prevented from entering the second ignition means chamber and from entering the second combustion chamber 25 through the second through hole 52.

The first transfer charge 35 charged into an aluminum cap is disposed directly above the first igniter 31. First through-holes 51 formed in lower portions of side wall of the inner cylinder 15 bring the first combustion chamber 20 and the first ignition means chamber into communication with each other. Each first through hole 51 is formed at positions exactly opposite to the center of the first transfer charge 35. An aluminum or stainless seal tape 60 is attached to the first through hole 51 from the inside.

The first through hole 51 and the first transfer charge 35 disposed to be exactly opposite to each other in this manner, thus, when the first igniter 31 is activated, the entire first transfer charge 35 is burnt substantially uniformly. Further, since the first-through hole 51 is formed in the lower portion of the inner cylinder 15, the ignition energy generated by combustion of the first transfer charge 35 is discharged in the radial direction and then, the direction of the ignition energy is changed to the upward direction. Therefore, the ignitability of the entire first gas generating agent accommodated in the first combustion chamber 20 is enhanced.

Figure 2:
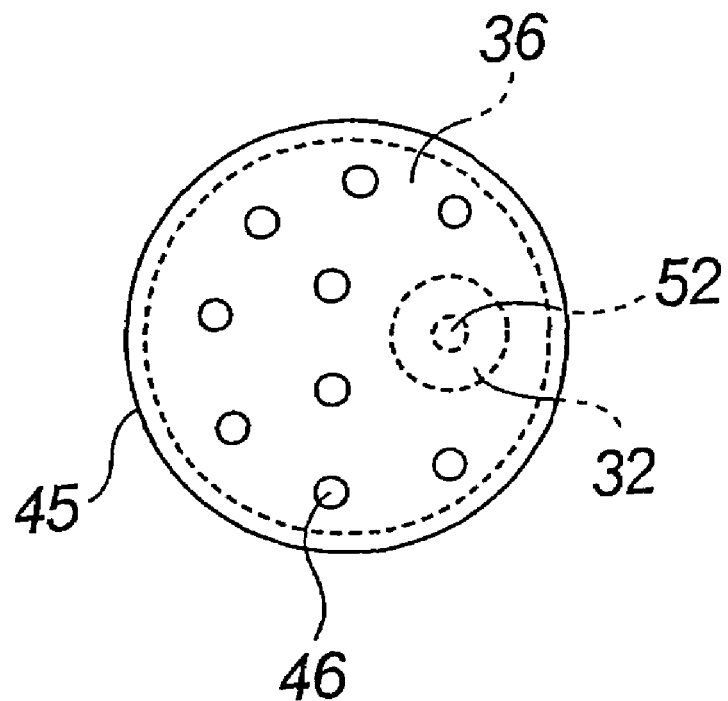
FIG. 2 is a schematic plan view for explaining a layout of a second transfer charge in FIG. 1.

The layout of the second transfer charge 36 will be explained with reference to FIG. 2. FIG. 2 is a plan view showing the layout of the second transfer charge 36.

The second transfer charge 36 is disposed above the second igniter 32 and on the flat plate-like partition wall 40. The second transfer charge 36 is charged into an aluminum cup 45 having plural flame-transferring holes 46. The plural flame-transferring holes 46 are not formed in the advancing direction (directly above the second igniter 32) of flame caused by activation of the second igniter 32.

By setting the positions of the flame-transferring holes 46 in this manner, when the second igniter 32 is activated and the generated flame therefrom advances in the directly upper direction, the flame is not discharged from the flame-transferring holes 46 without igniting the second transfer charge 36, the second transfer charge 36 is first ignited and burnt, and ignition energy generated by the combustion of the entire second transfer charge 36 is discharged into the second combustion chamber 25 from the flame-transferring holes 46. Therefore, the flammability of the second gas generating agent accommodated in the second combustion chamber 25 is enhanced.

Figure 3:
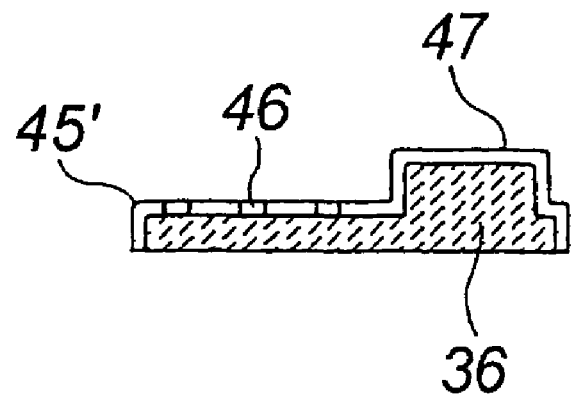
FIG. 3 is a schematic sectional view of another embodiment shown in FIG. 2.

As shown in FIG. 3, an aluminum cap 45' in which the second transfer charge 36 is charged may have a projection 47 directly above the second igniter 32. In case of the aluminum cap 45' including the projection 47, since the charging amount of the second transfer charge 36 can be increased, the ignitability of the second gas generating agent is further enhanced. Even if the aluminum cap 45' has the projection 47 as shown in FIG. 3, the aluminum cap 45' is provided at its flat surface except the projection 47 with the flame-transferring holes 46.

As shown in FIG. 1, a bottomed cylindrical retainer 55 is fitted into the second combustion chamber 25 such that an opening portion of the retainer 55 is directed downward, and the retainer is fixed at a side wall tip end 55a pressed against an inner wall 25a of the second combustion chamber 25. A gap 57 is provided between a side wall of the retainer 55 and the inner wall 25a of the second combustion chamber 25. The gap 57 has such a size that a gas passage can be secured.

The retainer 55 is provided at its side wall with plural opening portions 56. The height of the opening portions 56 in the axial direction is higher than the height of a third through-hole 53 formed in the inner cylinder 15.

The third through-hole 53 is closed with a stainless seal tape 58 from the outside, and the opening portions 56 may be closed with aluminum or stainless seal tapes 80 from the inside. In case of closing the opening portions 56 with the seal tapes 80, when combustion in the first combustion chamber 20 and combustion in the second combustion chamber 25 are started at the same time by the simultaneous activation of the two igniters, the internal pressure in the second combustion chamber 25 is temporarily increased and thus, the ignitability in the second gas generating agent is enhanced.

Since the gap 57 is provided between the side wall of the retainer 55 and the inner wall 25a of the second combustion chamber 25, the third through-hole 53 is prevented from being closed with the second gas generating agent. If the third through-hole 53 is closed with the second gas generating agent, the internal pressure in the second combustion chamber 25 may be excessively increased at an initial stage of combustion, and when the second gas generating agent which closes the third through-hole 53 is burnt, the third through hole 53 is opened and thus the internal pressure therein is abruptly reduced, and there is an adverse possibility that stable flammability is deteriorated.

By adjusting the height of each of the opening portions 56 and the third through-hole 53, even if the third through-hole 53 is located at lower sides of the second combustion chamber 25 as shown in FIG. 1, a gas generated by combustion of the second gas generating agent passes through the opening portions 56 located at upper sides of the second combustion chamber 25 and then is discharged from the third-through hole 53. Therefore, flame propagates in the second combustion chamber 25 entirely, and the flammability of the second gas generating agent is enhanced.

The total opening area of the third through-hole 53 is set smaller than the total opening area of the opening portions 56, and is set smaller than the total opening area of the gas discharge holes 17 and 18.

When the first igniter 31 is first activated and the second igniter 32 is activated later, that is, when the first gas generating agent in the first combustion chamber 20 is first burnt and the second gas generating agent in the second combustion chamber 25 is then burnt, the pressure in the second combustion chamber 25 becomes sufficiently higher than the pressure in the first combustion chamber 20. For this reason, by setting the total opening area of the third through-hole 53 as described above, the flow-out speed of the combustion gas from the second combustion chamber 25 is controlled by the third through-hole 53 and thus, the internal pressure in the second combustion chamber 25 at the time of combustion is also controlled by the third through-hole 53. Thus, the combustion state in the second combustion chamber 25 is controlled by the third through-hole 53. When the first igniter 31 and the second igniter 32 are activated at the same time, a difference in pressure between the first combustion chamber 20 and the second combustion chamber 25 becomes small and thus, the internal pressure in the second combustion chamber 25 is still higher, but the influence of pressure control by the third through-hole 53 becomes small.

By controlling the combustion state of the second combustion chamber 25 by the third through-hole 53, the following effect can be obtained.

When only the first igniter 31 is activated and only the first gas generating agent is allowed to burn like a case in which an automobile collides at a low speed, and if a remaining second gas generating agent is left unburnt, it is dangerous when the automobile is disassembled. For this reason, the second igniter 32 is activated after the activation of the first igniter 31 by about 100 milliseconds to ignite and burn the second gas generating agent. In such a case, if the combustion state of the second combustion chamber 25 can be controlled by the third through-hole 53, the ignitability and flammability of the second gas generating agent are enhanced and harmful gas such as NOx is restrained from being generated, which is preferable. If the generation time of the combustion gas from the second combustion chamber 25 is elongated, a requirement to elongate the inflation-maintaining time of the air bag can also be satisfied.

A cylindrical filter 65 is disposed between the first combustion chamber 20 and a peripheral wall of the housing 11 (diffuser shell peripheral wall 12b and closure shell peripheral wall 13b) for removing combustion residue from the combustion gas and for cooling the combustion gas.

An inner cylindrical shielding plate 66 is disposed at an inner side of the cylindrical filter 65. A gap (first gap 71) is provided between the cylindrical filter 65 and the inner cylindrical shielding plate 66. A structure of a portion of the inner cylindrical shielding plate 66 (a portion of the cylindrical filter 65 having substantially the same width as the gap) which comes into contact with the cylindrical filter 65 may be coarse instead of providing the gap, and the same state as provided with the gap may be established.

An outer cylindrical shielding plate 67 is disposed at an outer side of the cylindrical filter 65 in a state in which the outer cylindrical shielding plate 67 is in contact with an outer peripheral surface of the cylindrical filter 65. A gap (second gap 72) is provided between the outer cylindrical shielding plate 67 and a peripheral wall of the housing 11. It is preferable that the width of the second gap 72 is set wider than that of the first gap 71.

The inner cylindrical shielding plate 66 and the outer cylindrical shielding plate 67 do not cover the entire surface of the cylindrical filter 65 as shown in FIG. 1.

The inner cylindrical shielding plate 66 covers a lower portion of the cylindrical filter 65 (in a height range of about ½ to ⅔ of the entire height of the cylindrical filter 65) in a state in which one end peripheral edge abuts against the bottom surface 13a. The same state as shown in FIG. 1 may be obtained by first covering the entire surface of the filter 65 by the inner cylindrical shielding plate 66 and providing at a portion of the filter 65 with plural vent holes.

The outer cylindrical shielding plate 67 covers an upper portion of the cylindrical filter 65 (in a height range of about ½ to ⅔ of the entire height of the cylindrical filter 65) in a state in which one end peripheral edge abuts against the ceiling surface 12a. The same state as shown in FIG. 1 may be obtained by first covering the entire surface of the filter 65 by the outer cylindrical shielding plate 67 and providing at a portion of the filter 65 with plural vent holes.

By disposing the filter 65, the inner cylindrical shielding plate 66 and the outer cylindrical shielding plate 67 in this manner, the filtering effect (filtering of the combustion residue) and cooling effect of the combustion gas are further enhanced. A combustion gas generated by the first combustion chamber 20 and the second combustion chamber 25 enters the cylindrical filter 65 from a portion which is not covered by the inner cylindrical shielding plate 66. A portion of the combustion gas moves in the cylindrical filter 65 in the axial direction as it is and then reaches the second gap 72, ruptures a (aluminum or stainless) seal tape 75 and then is discharged from the gas discharge ports 17 and 18. A remaining portion of the combustion gas passes through the first gap 71 and is moved and then passes through the cylindrical filter 65 in the radial direction and reaches the second gap 72 and is discharged from the gas discharge ports 17 and 18.

The seal tapes 75 which close the gas discharging ports 17 and 18 may be ruptured at the same time or only part thereof may be ruptured depending upon the activation state of the igniters (only one of the igniters is activated, or both igniters are activated at the same time or the igniters are activated with a time lag).

In the gas generator 10 of the present invention, a mixture of transfer charge powder and gas generating agent molded article may be used as the first transfer charge 35 and the second transfer charge 36, or the above mixture may be used as the first transfer charge 35 and the gas generating agent molded article may be used as the second transfer charge 36. The gas generating agent molded article generates a gas of 1.2 moles/100 g or more at the time of combustion.

As the transfer charge powder, a mixture of boron and niter may be used. As the gas generating agent molded article, the same materials as the first and second gas generating agents may be used, but it is preferable to use a material having higher combustion temperature and excellent ignitability.

It is preferable that a mass ratio between the transfer charge powder and the gas generating agent molded article, i.e., transfer charge power/gas generating agent molded article is 2/8 to 8/2, and more preferably 3/7 to 7/3.

It is preferable that the gas generating agent molded article accommodated in the combustion chamber has a combustion temperature of 1000 to 1700° C., and that the gas generating agent molded article used as the transfer charge has a combustion temperature of 1700 to 3000° C.

EXAMPLE

Example 1

A gas generator for an air bag shown in FIGS. 1 and 2 was manufactured. Details are as follows:

(1) Gas Generating Agent

| | |
|---|---|
| first gas generating agent: | 84 g |
| second gas generating agent: | 30 g | shape of each of the first and second gas generating agents: the agent has through-hole having an outer diameter of 4.5 mm, an inner diameter of 1.2 mm, and a length of 4 mm.

composition of each of the first and second gas generating agents: 5 to 60 mass % of guanidine nitrate, 10 to 85 mass % of basic copper nitrate, 20 mass % or less of carboxymethyl cellulose sodium salt, and 0.1 to 20 mass % of aluminum hydroxide (combustion temperature of 1200 to 1700° C.).

(2) First Transfer Charge

| first transfer charge: | 4.5 g |
|---|---| first transfer charge (a mixture of boron/niter and gas generating agent molded article)

boron/niter: 2.5 g shape of gas generating agent molded article: an outer diameter of 1.5 mm, a length of 1.5 mm composition of gas generating agent molded article: 34.4 mass % of nitroguanidine, 55.6 mass % of strontium nitrate, 10.0 mass % of carboxymethyl cellulose sodium salt (combustion temperature: 2200° C.; amount of gas generated: 2.5 moles/100 g)

amount of gas generated from a gas generating molded article of the first transfer charge: 0.05 moles (3) Second Transfer Charge

| second transfer charge: | 3 g |
|---|---| second transfer charge (only gas generating agent molded article)

shape of gas generating agent molded article: an outer diameter of 1.5 mm, a length of 1.5 mm composition of gas generating agent molded article: the same as the first transfer charge amount of gas generated from gas generating molded article of second transfer charge: 0.075 moles Therefore, in the case of the first transfer charge and the second transfer charge, more gas is generated by the gas generating agent molded article as compared with a case having only boron/niter, but since the pressure in the combustion chamber is increased, the ignitability of a gas generating agent for inflating an air bag is enhanced.

The invention claimed is:

1. A gas generator for an air bag, comprising:
    a housing having a gas discharging hole;
    ignition means activated upon an impact, the ignition means including at least one igniter and at least one transfer charge, the at least one transfer charge being a mixture of a transfer charge powder and molded articles of a gas generating agent; and
    a combustion chamber accommodating a gas generating agent which is ignited and burnt to generate a combustion gas, wherein
    the ignition means includes a first igniter, a first transfer charge, a second igniter, and a second transfer charge, and when the first igniter and the second igniter are activated with a time difference, the second transfer charge combined with the second igniter which is activated with a delay includes only the molded articles of a gas generating agent, and
    the molded articles of the gas generating agent in the combustion chamber include guanidine nitrate, basic copper nitrate, carboxymethyl cellulose sodium salt, and aluminum hydroxide, and have a combustion temperature of about 1200 to 1700° C.

2. The gas generator for an air bag according to claim 1, wherein
    the first transfer charge includes a mixture of a transfer charge powder and molded articles of a gas generating agent,
    the second transfer charge includes only the molded articles of a gas generating agent, and
    the second transfer charge is adapted to be activated after an activation of the first transfer charge.

3. The gas generator for an air bag according to claim 1, wherein the first transfer charge is a mixture of boron and niter.

4. The gas generator for an air bag according to claim 1, wherein the molded articles of the gas generating agent of the first transfer charge include nitroguanidine, strontium nitrate, and carboxymethyl cellulose sodium salt.

5. The gas generator for an air bag according to claim 1, wherein the molded articles of the gas generating agent of the first transfer charge include about 34.4 mass % of nitroguanidine, about 55.6 mass % of strontium nitrate, and about 10.0 mass % of carboxymethyl cellulose sodium salt.

6. The gas generator for an air bag according to claim 1, wherein the molded articles of the gas generating agent of the first transfer charge include nitroguanidine, and strontium nitrate.

7. The gas generator for an air bag according to claim 1, wherein the molded articles of the gas generating agent of the first transfer charge or the second transfer charge generate a gas of at least 1.2 moles/100 g.

8. The gas generator for an air bag according to claim 1, wherein the molded articles of the gas generating agent of the first transfer charge or the second transfer charge include carboxymethyl cellulose sodium salt.

9. The gas generator for an air bag according to claim 1, wherein the gas generating agent in the combustion chamber has the combustion temperature of about 1200 to 1700° C.

10. The gas generator for an bag according to claim 4, wherein the molded articles of the gas generating agent of the first transfer charge has a combustion temperature of about 2200° C.

* * * * *